United States Patent [19]

Hug

[11] Patent Number: 5,657,322
[45] Date of Patent: Aug. 12, 1997

[54] DEVICE FOR THE EQUALIZATION OF DATA FLOW

[75] Inventor: Werner Hug, Rüti, Switzerland

[73] Assignee: Alcatel N.V., Netherlands

[21] Appl. No.: 453,100

[22] Filed: May 30, 1995

[30] Foreign Application Priority Data

Jun. 8, 1994 [CH] Switzerland .................. 01805/94

[51] Int. Cl.⁶ .................................................. H04J 3/14
[52] U.S. Cl. .................................................. 370/252
[58] Field of Search .......................... 370/13, 14, 16, 370/17, 60, 60.1, 94.1, 94.2, 58.1–58.3, 110.1, 112, 252, 253, 229–235; 340/825.01, 825.06; 395/180, 182.01, 182.02; 455/8, 9

[56] References Cited

U.S. PATENT DOCUMENTS

| | | | |
|---|---|---|---|
| 5,400,339 | 3/1995 | Sekine et al. | 370/110.1 |
| 5,420,861 | 5/1995 | De La Bourdonnaye | 370/84 |
| 5,432,783 | 7/1995 | Ahmed et al. | 370/60.1 |
| 5,432,785 | 7/1995 | Ahmed et al. | 370/60.1 |
| 5,448,559 | 9/1995 | Hayter et al. | 370/60.1 |

OTHER PUBLICATIONS

Internat'l Switching Symposium 1992, 25 Oct. 1992, Yokohama, pp. 285–289, N. Miyaho et al, "An ATM Switching System Architecture for First Generation of Broadband Services".

Proceedings of the Global Telecommunications Conference, Houston, Nov. 29,–Dec. 2, 1993, Bd 3 of 4, 29 Nov. 1993, Institute Elec. & Elec. Engineers, "A Flow Control Strategy for ATM Networks Based on a Unified Performance Parameter" 1822–1826.

Countdown to the New Millennium, Phoenix, Dec. 2,–Dec. 5, 1991, Bd 3 of 3, Dec. 1991, Institute of Elec. & Elec. Engineers. pp. 2110–2116, "Experimental ATM Transport System & Virtual Path Management Techniques", by Youichi Sato et al.

Primary Examiner—Douglas W. Olms
Assistant Examiner—Ajit Patel
Attorney, Agent, or Firm—Ware, Fressola, Van Der Sluys & Adolphson

[57] ABSTRACT

In networks with switched broad-brand communication, agreements exist between customer and network operator with regard to permissible data flows, which are maintained by a usage parameter control. To attempt to utilize the capacity of the network as much as possible, the network operator offers a service of utilizing the available bit rate frequency. This service requires a separate treatment of the respective data, to maintain the priorities and avoid overloading of the switching unit. The device for equalizing the data flow contains a switching network (22) which is located upstream of the switching unit (10), and reroutes the data flow that utilizes the available bit rate frequency service, to a server (23). This server preferably comprises an addressable buffer memory which is common to all rerouted connections, so that an equalization to the switching unit (10) takes place through all physical connections (1), and the buffered data can still be read in an orderly manner, in accordance with selected criteria.

9 Claims, 2 Drawing Sheets

DEVICE FOR THE EQUALIZATION OF DATA FLOW

TECHNICAL FIELD

The invention lies in the area of data flow control in broad-band communication networks.

BACKGROUND OF THE INVENTION

Broad-band communication networks make it possible to exchange the most diverse kinds of digital data by means of the Asynchronous Transfer Mode (ATM) in accordance with a CCITT recommendation. A logical connection, which is established for a short time, occupies a so-called virtual channel. The data flow, i.e. the mount of data passing through this channel per unit of time, depends on the type of communication (speech, moving real-time images, data exchange, etc.) and occupies a corresponding portion of the total data flow that is available in the physical transmission medium. For example, voice transmission requires very few constant data units per unit of time, while a data exchange preferably uses many data units per unit of time, but without special requirements regarding the time sequence. The data flow in a virtual channel can increase and decrease and be fully exhausted in the course of time. The data flow can be correctly estimated for many types of transmissions, such as perhaps video transmissions.

The required capacity in the transmission medium can be kept available per virtual channel or, with several channels held in common in a certain network section, per virtual path in accordance with an agreement. In that case, no doubt the most important parameter is the number of data units that can be transmitted per unit of time, the so-called bit rate. Beyond that, an agreement between network operator and customer can address further parmeters, such as perhaps a short time during which a certain number of data units can follow each other more rapidly. Maintenance of such agreements at the customer-network interface is provided by a special circuit part, the usage parameter control (UPC). It is often installed at the input of an ATM switching unit. If the agreement is not complied with, the UPC rejects any excess data units.

Although the agreements arrived at in this manner prevent an overload, namely of the switching unit, they also result in that the potential capacity of the connections remains unused. It is therefore intended to offer a broad-band network service which permits the utilization of the available bit rate frequency. A customer who utilizes this service can make data transfers up to the maximum load of the connection, beyond the agreed capacity that is always available to him, where the maximum can be determined by another agreement or by the highest bit rate permitted by the circuit technology. This service is of particular interest to the exchange of data that is not critical with respect to time.

On the other hand, this expansion of the connection load produces the danger of overloading the switching unit. A possibility of reducing this danger consists in providing a buffer for each physically available connection, which altogether limits the data flow through this connection. However, it can happen that the data flows are relatively heavily restricted in the paths passing through this connection, even though the switching unit is not yet overloaded by a wide margin.

SUMMARY OF THE INVENTION

It is therefore necessary to find a device which permits the customer who is connected to a switching unit of a network, to make as much use as possible of the available bit rate frequency, but to ensure that the switching unit is not overloaded.

The sought device is a switching network connected before the switching unit routes all virtual paths which utilize the available bit rate frequency service, to a server. This server buffers all incoming data and concentrates them, preferably to a few physical connections with a high bit rate, which are connected to other inputs of the switching unit. This arrangement has the advantage of being able to create an equalization between the individual supply lines. A preferred configuration uses a server with an addressable buffer memory that is common to all rerouted connections.

The existing usage parameter control remains in operation. Since the server itself limits the data flow, one control connected before the switching network is sufficient. Virtual channels in paths for which the service of utilizing the available bit rate frequency is agreed, and whose data flow is under the maximum, can pass, while the other channels are tested in accordance with the agreement and, if necessary, the data units are rejected. Another arrangement uses the usage parameter control located mostly at the input of the switching unit. However, the latter only monitors the agreements without the service of utilizing the available bit rate frequency, since no other data flows exist at these inputs. In this arrangement therefore, control of the agreed upon maximum of the permissible bit rate frequency takes place in a simplified UPC between the switching network and the server.

A configuration derived therefrom provides for discrimination of the data units at the inputs to both usage parameter controls, in regard to whether or not they employ the available bit rate frequency utilization service. The usage parameter control connected before the switching unit separates these, while the one connected before the server lets only the others pass. This arrangement has the great advantage that the switching network is reduced to a simple branch for each physical connection. It is therefore particularly suitable for optical connections.

BRIEF DESCRIPTION OF THE DRAWINGS

The following describes the invention in greater detail by means of FIGS. 1 to 4, where.

BEST MODE FOR CARRYING OUT THE INVENTION

A physical connection between a network customer interface and the switching unit transports data units along several virtual paths, which in turn contain several virtual channels. In accordance with an agreement, a predetermined data flow can be transported along each of these channels or paths. On rare occasions, the customer will use all connections simultaneously. The physical connection therefore has nearly always free transportation capacity. On the other hand, it is desirable for the customer to be able to transport a larger amount of data now and then. To cover this need, the free transportation capacity of the connection is made available to him. An expanded agreement therefore provides that the data flow can be increased up to a maximum provided by the highest allowable bit rate frequency of the physical connection, or by agreement. However, the network operator needs to keep the amount of data at the switching unit within bounds, so that it does not become overloaded.

Figure 1:
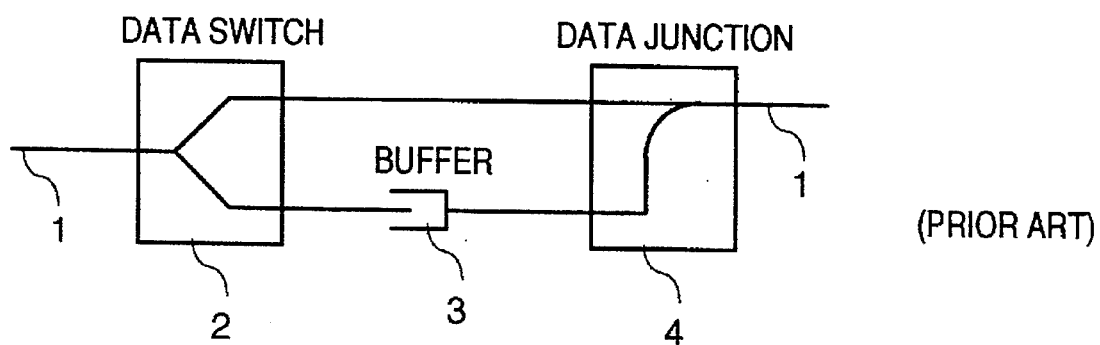
FIG. 1 is an assembly in principle of a buffer for the equalization of data flow in a connection.

One possibility of restricting the data traffic consists of utilizing the full capacity of a connection for a short time, but only permitting a submaximum load for a medium period of time, so that the total load of the switching unit cannot be exceeded in all of its inputs. A restriction of this kind can take place with the aid of a buffer, which is constructed in accordance with the principles depicted in FIG. 1. The data in physical connection 1, which belong to a virtual channel whose data are transported immediately per agreement, are guided by the data crossover network 2 directly to the output, where they enter into the continuation of the physical connection 1. The remaining data are routed by the data crossover network 2 to a data memory 3. The data confluence 4 reads the memory when the possibility exists to insert data units into the privileged data flow at that location.

Figure 3:
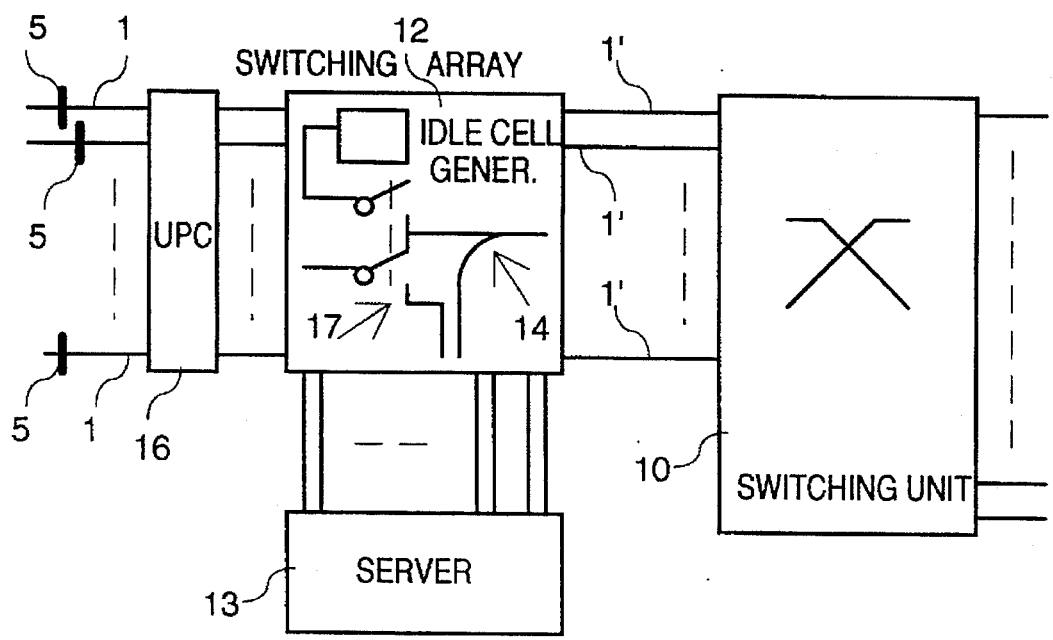
FIG. 3 is a diagram of the device for equalizing the data flow.

The above described possibility allows no equalization of the data flow across several physical connections, which is desirable if the existing capacities are to be used to best advantage without overloading the switching unit. The invention therefore provides a switching network between the network user interfaces and the switching unit, for the intermediate storage of the nonprioritized data units in a common server. FIG. 3 schematically illustrates the arrangement of the device according to the invention. A switching network 12 is inserted in the multiple physical connections 1 between the network user interfaces 5 and the switching unit 10. Before network 12 is the usage parameter control 16, which can also be configured as a switching unit with switching network 12. The server 13 is coupled to the switching network 12. The function of the switching network 12 is symbolically represented by a two-way switch 17 and, in the present variation, by a data confluence 14. A signal in a physical connection 1 is converted into a data stream at the input of usage parameter control 16, where it is then controlled. Data traffic running outside of the agreement is separated. Virtual paths, for which the service of utilizing the available bit rate frequency has been agreed, are allowed to pass, but are rerouted by the switching network 12 to the server 13; this means that the two-way switch 17 is in the lower symbolic position. The data released by the server 13 after the necessary buffering flow back into the physical connection 1' through the data confluence 14.

In the described variation, the switching network is also used to loop branched data back into the physical connections 1' after buffering, through the direct connections that are available when switch 17 is in its other position. But this is not required. The buffered data, which as before contain all the routing information, can rather be routed directly to one or more of the switching unit inputs. Although such a configuration requires more inputs at the ATM switch, it simplifies the switching network effort considerably. The switching unit is not further burdened by the additional inputs, since the data either flow only through the direct connections or through the additional inputs.

Figure 4:
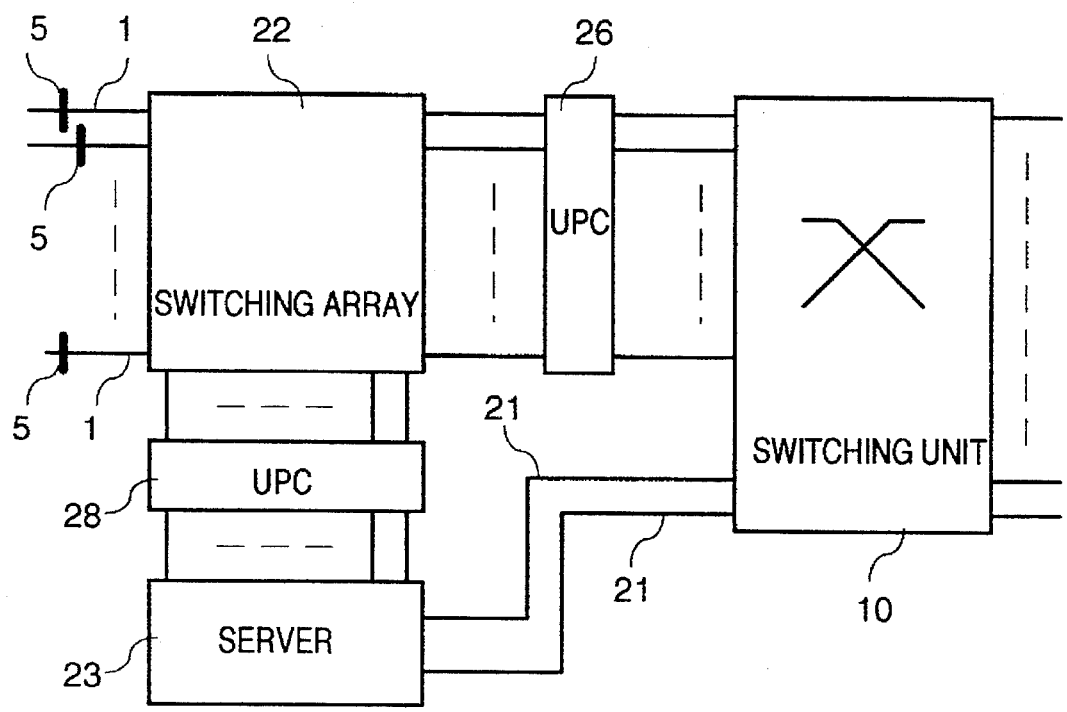
FIG. 4 is a diagram of the device for equalizing the data flow in a preferred variation.

FIG. 4 depicts an arrangement of the just described type. Again, a switching network 22 is built into in the multiple physical connections 1 between the network user interfaces 5 and the switching unit 10. However, it only switches the paths for which the service of utilizing the available bit rate frequency was agreed. A data confluence 14 is omitted. Instead, the outputs of server 23 are routed directly to the switching unit 10 through physical connections 21 with a high bit rate frequency. If the physical connections 1 are for example several lines with a permissible bit rate frequency of 34 Mbit/s and some with 155 Mbit/s, two connections 21 with 622 Mbit/s each would be sufficient, depending on the number of connections 1.

Since a connection may not simply be interrupted, in the case where the switch 17 reroutes the data flow to the server, the connection to the switching unit must be correctly bridged. As best seen in FIG. 3, this can be done with an idle cell generator 19, which is hooked up to the cited connection when switch 17 is activated.

FIG. 4 also illustrates another arrangement of the usage parameter control. It accounts for the condition where the UPC can be a part of the switching unit 10. Since the outputs of switching network 22, which are directed toward switching unit 10, only contain data for which the service of utilizing the available bit rate frequency was not agreed, there is no change in the usage parameter control 26 as illustrated in FIG. 4, as opposed to operation without the named service. But in order to also monitor the compliance with the agreements regarding the utilization of the available bit rate frequency, another simplified usage parameter control 28 is needed, which is advantageously inserted between the switching network 22 and the server 23, so that only the rerouted data streams are monitored. In this case as well, a switching unit between usage parameter control 28 and switching network 22 and/or server 23 is definitely possible.

The just described arrangement is particularly simple with respect to the switching network, if the conversion of the signals in physical connections 1 into data streams takes place at the inputs of both usage parameter controls 26, 28, and these then discriminate by themselves between the data, as to whether or not they are entitled to the service of utilizing the available bit rate frequency. In that case the switching network only contains one branch of each incoming physical connection. In case of electrical connections, the branching of one conducting connection is sufficient. In case of optical connections (optical waveguides), a so-called splitter takes care of uncoupling the optical signal. After the signal is converted into the stream of data units at the input to the usage parameter control 26 located before the switching unit 10, the control first tests each of these data units individually, to determine whether they belong to dam which utilize the available bit rate frequency service—the discrimination information exists in the head of the data unit. In the affirmative case it rejects the data unit, in the negative case it routes it on and subjects it to the other usage parameter control test. At its expanded input, the usage parameter control 28 located before server 23 also converts the signal arriving at the branched physical connection into the stream of data units and individually tests each data unit, but separates the data units that do not utilize the available bit rate frequency service.

Figure 2:
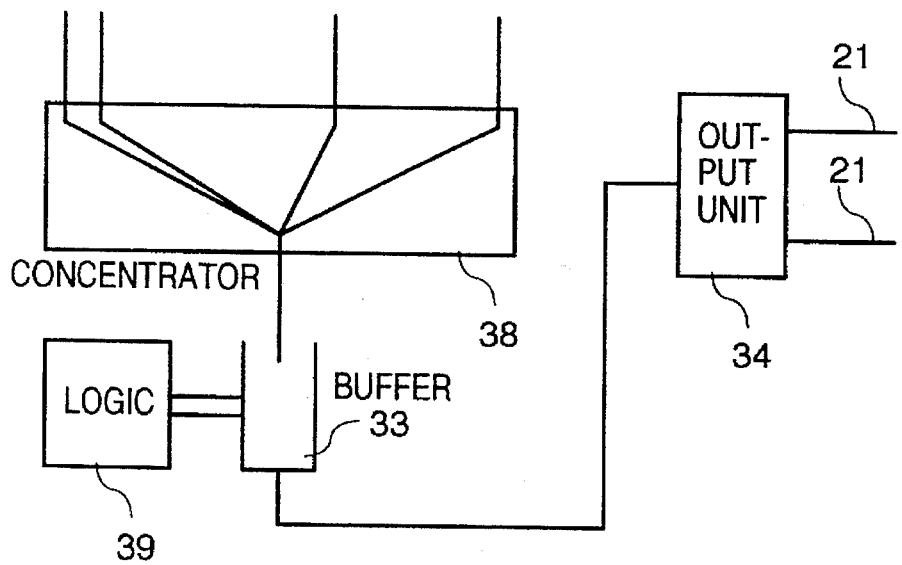
FIG. 2 is an assembly in principle of the server.

FIG. 2 illustrates the essential parts of the server. The data at the inputs enter into a concentrator 38, which routes them to a buffer memory 33. A special server logic 39 is needed to manage and read this memory. The read-out data units are routed by output unit 34 to the physical outputs 21. In the case of the server 13 according to the configuration in FIG. 3, the output unit 34 takes over the separation of the data stream into the different output lines; this requires a number of data confluences analogous to the data confluences 4 in switching network 12.

An addressable buffer memory 33 is preferred. With it, it is possible to manage and read the data units according to selected order criteria. An example can illustrate the advantage: the service of utilizing the available bit rate frequency is used simultaneously in two virtual paths for the transmission of a row of existing images. The paths cross two different physical connections. The first one has a bit rate frequency of 155 Mbit/s, the second has one of 34 bit/s and, in contrast to the first, is already heavily loaded with priority traffic. For that reason, a dissimilarly larger number of data units per unit of time enter the memory through the first connection than through the second. Without the management with the addressable buffer memory, the data are read as a uniform flow in the sequence of their arrival, but slower than their arrival rate. The transportation of a single image through the second connection takes as long as the transportation of the dissimilarly larger number of images through the first connection. This blurring of the data units can be avoided with adequate buffer memory addressing and management.

The nature of the buffer memory 33 is finite. Aside from the unwanted rejection of data units, an overflow can only be avoided if the data sources, meaning the customer interfaces 5, are instructed to choke the data flow. This return signal, which takes place in accordance with autonomous protocols, pertains to the service of utilizing the available bit rate frequency. The necessary signals originate from the server logic 39. Particularly in the configuration with optical branches in the switching network, it is not possible to send a direct return signal through the incoming line. However, it can be sent through one of the server outputs to the switching unit 10, through which it returns to the interface 5.

What is claimed is:

1. An apparatus for balancing the data flow between network interfaces (5) and a switching unit (10) in broadband networks with usage parameter control and a service for utilizing the available bit rate, the interfaces (5) and the switching unit (10) being connected to each other by a plurality of physical connections (1, 1', 21), characterized in that a switching array (12, 22) is connected between said physical connections (1, 1', 21), which switching array reroutes connections which use the service for utilizing the available bit rate from an original, direct connection to the switching unit (10) to a server (13, 23) connected to the switching array (12, 22), the server for temporarily storing the rerouted connections, and further wherein the apparatus includes means (17, 21) for connecting the temporarily stored rerouted connections in the server for presentation to the switching unit (10).

2. An apparatus for balancing the data flow between network interfaces (5) and a switching unit (10) in broadband networks with usage parameter control and a service for utilizing the available bit rate, the interfaces (5) and the switching unit (10) being connected to each other by a plurality of physical connections (1, 1', 21), characterized in that a switching array (12, 22) is connected between said physical connections (1, 1', 21), which switching array reroutes connection which use the service for utilizing the available bit rate from an original, direct connection to the switching unit (10) to a server (13, 23) connected to the switching array (12, 22), and wherein the server (13, 23) is provided with an addressable buffer memory (33) which is common to all rerouted connections.

3. An apparatus for balancing the data flow between network interfaces (5) and a switching unit (10) in broadband networks with usage parameter control and a service for utilizing the available bit rate, the interfaces (5) and the switching unit (10) being connected to each other by a plurality of physical connections (1, 1', 21) characterized in that a switching array (12, 22) is connected between said physical connections (1, 1', 21), which switching array reroutes connections which use the service for utilizing the available bit rate from an original, direct connection to the switching unit (10) to a server (13, 23) connected to the switching array (12, 22), and further wherein the connections rerouted via the server (23) are conducted in a concentrated manner on few physical connections with a high bit rate (21) directly to further inputs of the switching unit.

4. An apparatus as claimed in claim 1, characterized in that the usage parameter control (16) for the entire data flow is provided upstream of the switching army (12).

5. An apparatus as claimed in claim 3, characterized in that a usage parameter control (26) for the data flow without the service of utilizing the available bit rate is connected between the switching array (22) and the switching unit (10) and that a further usage parameter control (28) for the data flow with the service for utilizing the available bit rate is connected between the switching array (22) and the server (23).

6. An apparatus as claimed in claim 5, characterized in that the switching array (22) only consists of a branch for each physical connection (1), and that both usage parameter controls (26, 28), each comprise a filter, the filter within the usage parameter control (26) between the switching array (22) and the switching unit (10) filtering out the data flow of the service for utilizing the available bit rate, and the filter within the usage parameter control (28) between the switching array (22) and the server (23) only allowing the data flow of the service for utilizing the available bit rate to pass and filtering out the rest.

7. An apparatus for balancing the data flow between network interfaces (5) and a switching unit (10) in broadband networks with usage parmeter control and a service for utilizing the available bit rate, the interfaces (5) and the switching unit (10) being connected to each other by a plurality of physical connections (1, 1', 21), characterized in that a switching array (12, 22) is connected between said physical connections (1, 1', 21), which switching array reroutes connections which use the service for utilizing the available bit rate from an original, direct connection to the switching unit (10) to a server (13, 23) connected to the switching array (12, 22), and further wherein the switching array (12, 22) comprises at least one idle cell generator (19) which maintains the data flow of a connection during the rerouting of said connection.

8. An apparatus for balancing the data flow between network interfaces (5) and a switching unit (10) in broadband networks with usage parmeter control and a service for utilizing the available bit rate, the interfaces (5) and the switching unit (10) being connected to each other by a plurality of physical connections (1), characterized in that a switching array (22) is connected to the physical connections (1) from the network interfaces (5), which switching array reroutes connections which use the service for utilizing the available bit rate from an original, direct connection to the switching unit (10) to a server (23) connected to the switching array (22), the server for temporarily storing the rerouted connection and where physical connections (21) connect the server to the switching unit (10), so that the rerouted connections temporarily stored in the server are connectable to the switching unit after storage in the server.

9. An apparatus for balancing the data flow between network interfaces (5) and a switching unit (10) in broadband networks with usage parameter control and a service for utilizing the available bit rate, the interfaces (5) and the switching unit (10) being connected to each other by a plurality of physical connections (1), characterized in that a switching array (22) is connected to the physical connections (1) from the network interfaces (5), which switching array reroutes connections which use the service for utilizing the available bit rate from an original, direct connection to the switching unit (10) to a server (23) connected to the switching array (22) and where physical connections (21) connect the server to the switching unit (10), and further wherein the usage parameter control comprises a usage parameter control (26) for the data flow without the service of utilizing the available bit rate that is connected between the switching array (22) and the switching unit (10) and that a further usage parameter control (28) for the data flow with the service for utilizing the available bit rate is connected between the switching array (22) and the server (23).

* * * * *

UNITED STATES PATENT AND TRADEMARK OFFICE
CERTIFICATE OF CORRECTION

PATENT NO. : 5,657,322
DATED : August 12, 1997
INVENTOR(S) : Werner Hug

It is certified that error appears in the above-identified patent and that said Letters Patent is hereby corrected as shown below:

On Title Page [30] under Foreign Application Priority Data, "01805/94" should be --01805/94-5--

Column 6, line 12 (line 3 of claim 4), "army" should be --array--

Signed and Sealed this

Fourth Day of November, 1997

Attest:

Attesting Officer

BRUCE LEHMAN

Commissioner of Patents and Trademarks